United States Patent [19]

Clifton, Jr.

[11] Patent Number: 4,927,173

[45] Date of Patent: May 22, 1990

[54] APPARATUS FOR PREVENTING TRUCK ROLL OVER IN THE EVENT OF FAILURE OF ITS SUSPENSION SYSTEM

[76] Inventor: Raymond E. Clifton, Jr., 9746 Rte. 99, P.O. Box 202, Ellicott City, Md. 21043

[21] Appl. No.: 234,605

[22] Filed: Aug. 22, 1988

Related U.S. Application Data

[63] Continuation-in-part of Ser. No. 128,712, Dec. 4, 1987, abandoned.

[51] Int. Cl.$^5$ .................... B60R 21/02; B60G 11/04
[52] U.S. Cl. .................................. 280/755; 180/271; 280/688; 280/718; 267/51
[58] Field of Search ............... 280/680, 686, 688, 718, 280/719, 720, 754, 755, 715; 180/271, 281; 267/51

[56] References Cited

U.S. PATENT DOCUMENTS

| 489,628 | 1/1893 | Colleret | 280/754 X |
|---|---|---|---|
| 2,128,806 | 8/1938 | Dwork | 280/754 |
| 3,046,036 | 7/1962 | Page | 280/680 |
| 3,799,571 | 3/1974 | Sudberry | 280/715 |
| 3,850,444 | 11/1974 | Wright et al. | 280/715 X |
| 4,796,910 | 1/1989 | Starr, Sr. | 267/51 X |
| 4,813,695 | 3/1989 | Reid | 280/680 X |

FOREIGN PATENT DOCUMENTS

| 520350 | 3/1931 | Fed. Rep. of Germany | 280/754 |
|---|---|---|---|
| 2852600 | 6/1979 | Fed. Rep. of Germany | 280/755 |
| 2582593 | 12/1986 | France | 280/688 |
| 602022 | 2/1960 | Italy | 280/754 |
| 2174649 | 12/1986 | United Kingdom | 280/755 |

Primary Examiner—Charles A. Marmor
Assistant Examiner—Brian L. Johnson
Attorney, Agent, or Firm—Leonard Bloom

[57] ABSTRACT

A bracket is attached to the frame of a heavy load bearing vehicle over the axle housings to prevent the tires, wheels and axles from being translated or skewed with respect to the frame in the case of a suspension failure. By preventing unwanted translation, disasters caused by overturned vehicles or loss of control are prevented. The bracket has a portion for attaching to the vehicle frame, a portion for supporting the frame, a portion for stopping the frame from falling too far vertically and for resting upon an axle housing upon suspension failure, a portion for preventing forward translation of the frame, and a portion for preventing rearward translation of the frame.

21 Claims, 9 Drawing Sheets

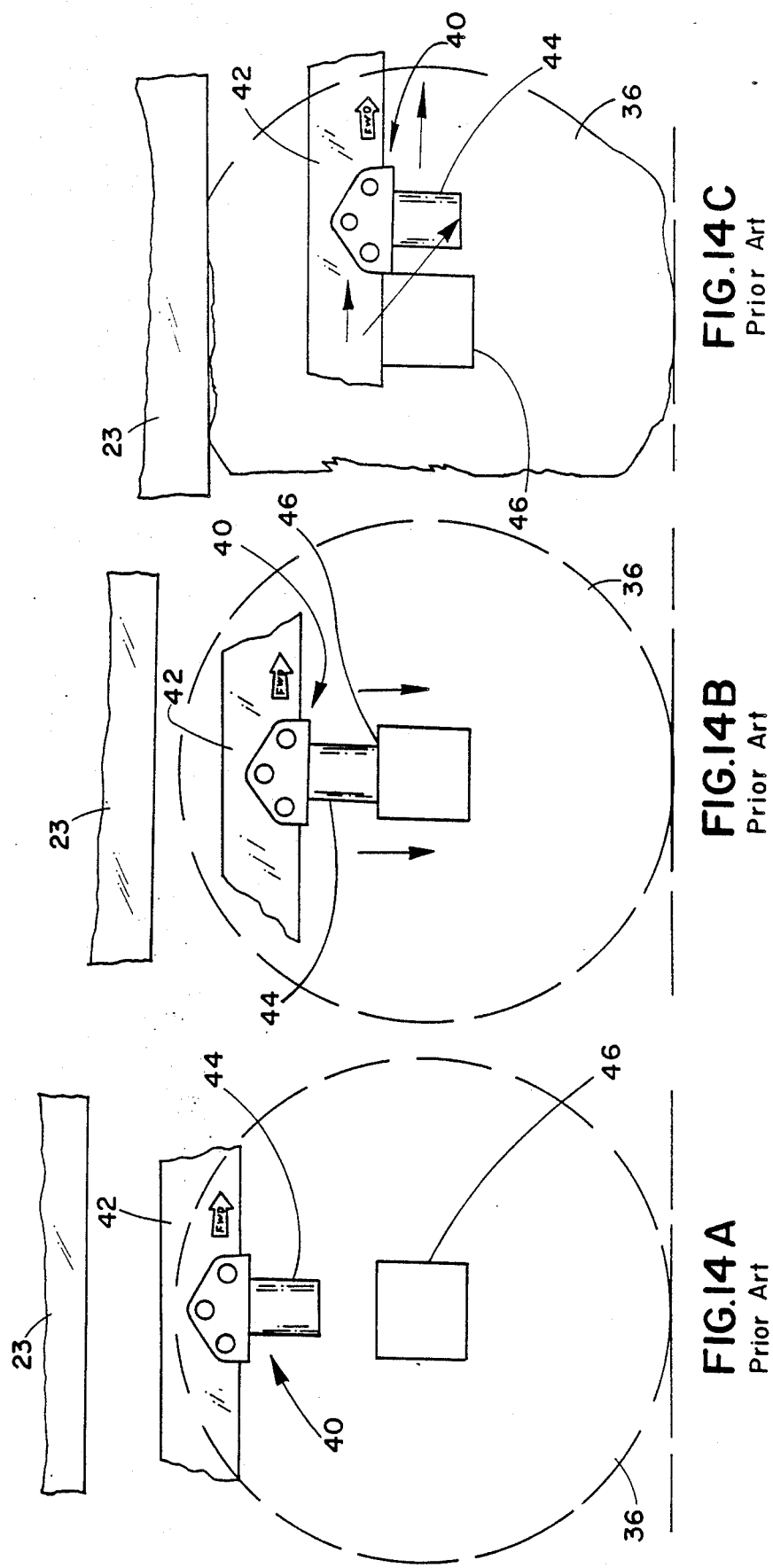

APPARATUS FOR PREVENTING TRUCK ROLL OVER IN THE EVENT OF FAILURE OF ITS SUSPENSION SYSTEM

CROSS REFERENCE TO RELATED APPLICATIONS

This application is a continuation-in-part of application Ser. No. 128,712, filed Dec. 4, 1987, now abandoned the disclosure of which is, by reference, incorporated herein in its entirety.

FIELD OF THE INVENTION

This invention relates generally to motor vehicles and particularly to heavy load carrier vehicles and means for preventing disasters resulting from failure of a suspension component of the vehicle during motion of the vehicle.

BACKGROUND OF THE INVENTION

In a motor vehicle a suspension generally supports the vehicle frame in a position above the suspension components. When a suspension component fails, support for the frame may be lost, and the frame "bottoms out" whereupon the frame falls down upon lower vehicle components such as axle housings, differentials, or tires and wheels. It is known to use a metal stop positioned between the frame and axle housing to stop over travel of the suspension or to absorb impact between the frame and axle housing if the suspension fails. The metal stop also serves to prevent total collapse of the frame upon other lower vehicle components and suspension components.

The known metal stops might prevent total collapse of the frame upon lower suspension components if the vehicle were stationary. However, when a failure of suspension components occurs as the vehicle is in motion, another serious and potentially disastrous problem may occur. The major vehicle components that are located beneath a frame and that are first contacted when a suspension failure occurs are the stop block and axle housing. During motion of the vehicle, the wheels are spinning, and when the body collapses upon the spinning wheels the body serves as a brake upon the spinning wheels to cause their motion to be slowed down severely. In spite of the fact that the wheels are slowed down, the body and the load that is borne by the body continue to have considerable momentum in the direction of motion. As a result, the unsupported portion of the body above the wheels tends to continue forward and be translated forward with respect to the wheels. In the brief matter of seconds or less, the frame and body can translate so that the wheels move out from under the suspension stop. At this point the frame, no longer supported by the wheels or the axle stop allows the walking beam to come into contact with the road surface which causes vehicle rollover or loss of control.

Furthermore, if a suspension failure occurs on only one side of the rear of the vehicle with the suspension on the other side of the vehicle remaining intact, the axle and wheels will translate in a skewed manner causing the wheels to exert unwanted steering forces on the vehicle creating dangerous conditions resulting in complete loss of control.

Furthermore, the experience of the present inventor has shown that even at a low speed of about 10 miles per hour (16 kilometers per hour), failure of a walking beam sleeve or other related suspension components can cause the vehicle to overturn. Drivers and passengers have been killed or injured in such accidents.

In case of a vehicle roll over, in addition to requiring costly repair of failed suspension components, there would be excessive costs for repair of additional vehicle components damaged during the roll over not to mention personal injury and loss of life.

More specifically, the following failure sequence may occur on either side or front or back of a vehicle equipped with a walking beam suspension. First, the walking beam or another suspension component fails as the vehicle is moving. Then, a frame rail, released from its support by the suspension due to the failure, falls along with the vehicle body supported thereby. The vehicle body then strikes the tires which may shred and blow out because they are cut by underbody parts. However, the unsupported vehicle body and frame continue on their forward motion thereby causing the vehicle body and frame to translate and move away from the axle. Once the vehicle body causes tire failure the whole vehicle will lean excessively to one side, and roll over and/or loss of control will then occur.

Another manner of failure of a walking beam suspension can also occur. If the forward end of the walking beam fails, the walking beam can dig into the road surface and catapult the side of the vehicle upward, turning it on its side or overturning it completely depending on the vehicle speed and the surface that is travelled.

Suspension failure can occur when the vehicle is moving either forward or in the reverse direction.

Another problem associated with a suspension failure described above is that the natural reaction of a driver would be to apply the brakes during the failure. However, application of the brakes has a deleterious effect in that it increases the tendency of the failed suspension to separate from the vehicle.

Still another problem associated with a suspension failure may be the reaction of a vehicle operator to apply more throttle in the event of a suspension failure. In such a case, the axle housing would translate forward in relation to the frame causing the suspension stop to slip off the rear of the axle housing. Thereby, the frame and body would similarly lean excessively.

SUMMARY OF THE INVENTION

Accordingly, an object of the invention is to provide a system that prevents a vehicle body from coming into contact with tires and wheels and also prevents a skewed translation of axles during a suspension failure.

Another object of the invention is to provide a system which prevents a vehicle body and frame from translating with respect to a suspension that fails during vehicle motion.

Still another object of the invention is to prevent a vehicle from rolling over when a suspension failure occurs during vehicle motion.

Yet another object of the invention is to provide a system that prevents the vehicle body from contacting tires, wheels and axles whether a suspension failure occurs while the vehicle is moving forward or in the reverse direction.

In accordance with the principles of the invention, for a moving vehicle having a frame, a suspension supporting the frame, and tires, wheels, and axles spaced from the frame by the suspension, means are provided for preventing the frame from translating away from the axles when the suspension fails during movement of the vehicle. The translation preventing means include a portion attached to the frame and extending downward from the frame or a portion extending upward from the axle housing for preventing translation of the frame with respect to the tires, wheels and axle housing spaced therefrom.

Preferably, the translation preventing means is in the form of a bracket attached to the frame. The bracket includes a vertical stop portion which extends downward from the frame toward the housing for the axles. The vertical stop portion prevents the frame from crashing directly into the axle housing upon occurrence of the suspension failure.

The preferred bracket of the invention also includes a forward translation prevention portion which extends downward from the vertical stop portion. Upon the occurrence of a suspension failure, the forward translation prevention portion is positioned adjacent to the rear side of the axle housing and prevents forward translation of the frame with respect to the axle housing.

The bracket of the invention also includes a rearward translation prevention portion which extends downwardly from the vertical stop portion and is positioned adjacent to the front side of the axle housing upon the occurrence of a suspension failure. The rearward translation prevention portion prevents the frame from translating rearwardly if a suspension failure occurs during rearward motion of the frame, that is when the vehicle is moving in reverse. The rearward translation prevention portion also prevents the frame from translating forward upon undesirable throttle application.

Viewed in another aspect, the present invention finds particular utility in combination with a heavy-duty truck having a frame and further having at least one axle suspended on the frame by a suspension means, the axle being housed in an axle housing. More particularly, the invention provides a means for preventing a truck roll over or other hazardous driving condition from developing in the event of a failure of the suspension means.

The bracket also includes a portion upon which the frame rests. The frame rest portion extends under the frame from the frame attachment portion of the bracket. During an occurrence of a suspension failure, the weight of the vehicle body rests upon the frame, the frame rest portion, the vertical stop portion, and the axle housing.

BRIEF DESCRIPTION OF THE DRAWINGS

The above and other advantages of this invention will become more readily apparent on examination of the following description, including the drawings in which like referenced numerals refer to like parts.

FIGS. 14A–14C illustrate the operation of a prior art vertical stop resulting in translation of the frame with respect to the axle housing subsequent to a suspension failure.

DESCRIPTION OF THE PREFERRED EMBODIMENTS

Figure 1:
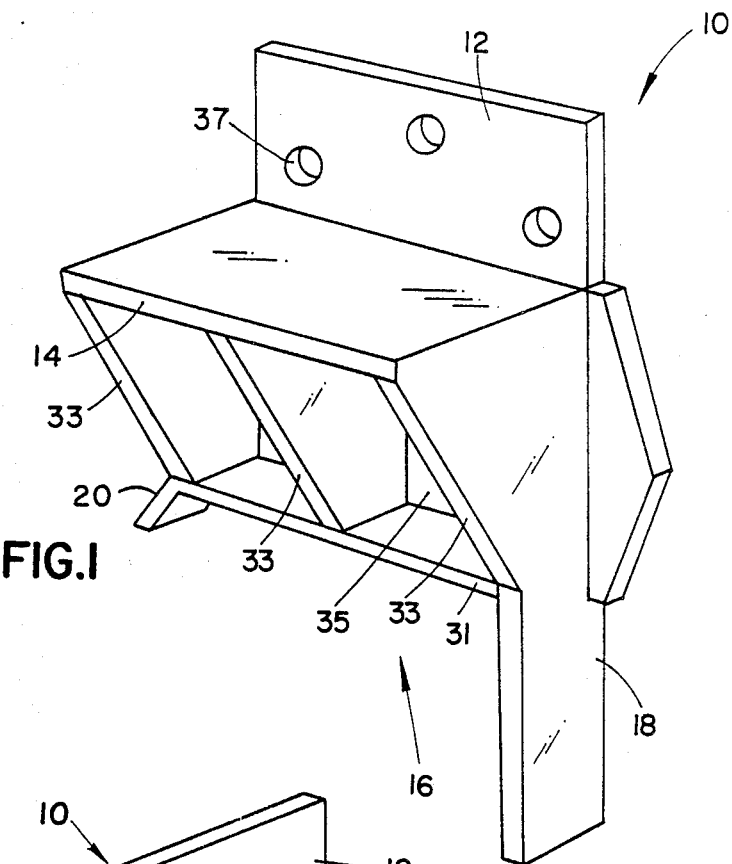
FIG. 1 is an elevational perspective view of a bracket of the invention with the rearward translation preventing element in perspective with respect to the forward translation preventing element.
Figure 2:
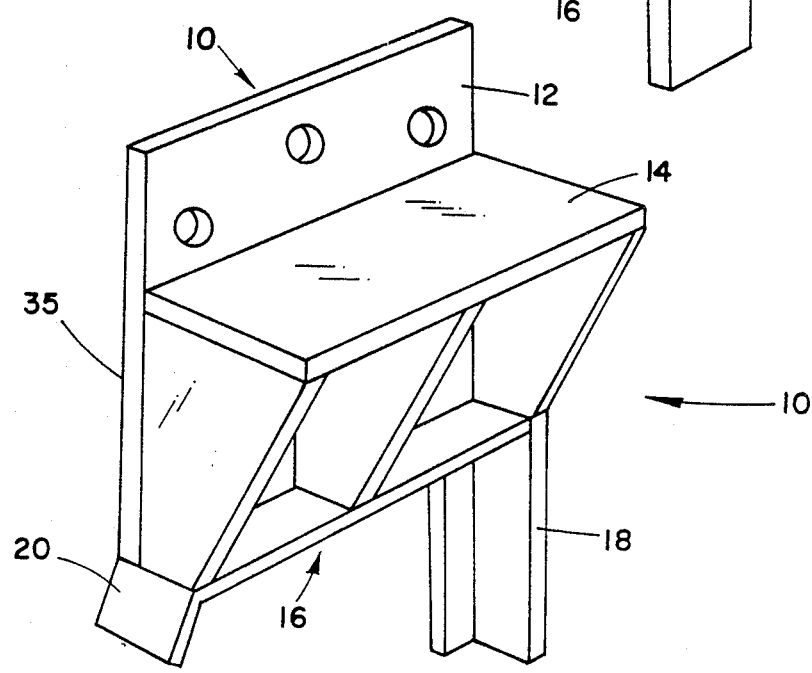
FIG. 2 is an elevational perspective view of the bracket of the invention with the forward translation prevention element in perspective with respect to the rearward translation prevention element.

FIGS. 1 and 2 show brackets 10 of the invention which include a portion 12 for attaching the bracket to the frame of the vehicle, a frame rest portion 14 for fitting under the vehicle frame, a vertical stop portion 16 for resting upon an axle housing in case of suspension failure, a forward translation prevention portion 18 for preventing a frame from translating in a forward direction with respect to the axle housing, if a suspension failure occurs when the vehicle is moving in a forward direction, and a rearward translation prevention portion 20 for preventing the frame from translating rearwardly with respect to the axle housing if a suspension failure occurs when the vehicle is moving in a rearward direction or if the throttle is applied inappropriately.

Figure 3:
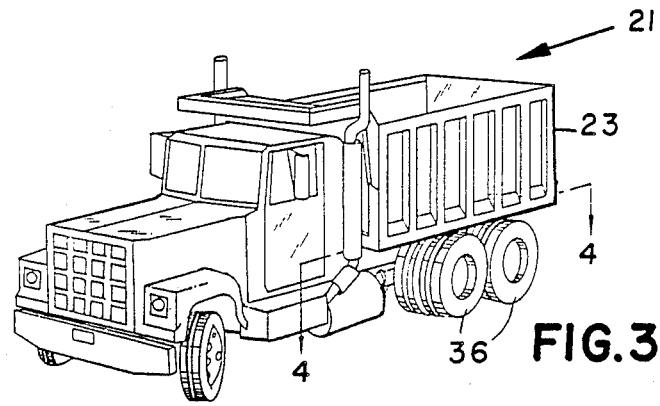
FIG. 3 is a perspective view of a vehicle, in this case a dump truck, in which the brackets of the invention can be installed.

FIG. 3 shows a typical vehicle, a dump truck 21, in which the bracket of the invention can be installed. The truck 21 includes a material-containing body 23. Other vehicles such as garbage trucks, tanker trucks, and a myriad of other kinds of heavy load vehicles can readily benefit by employing the invention.

Figure 4:
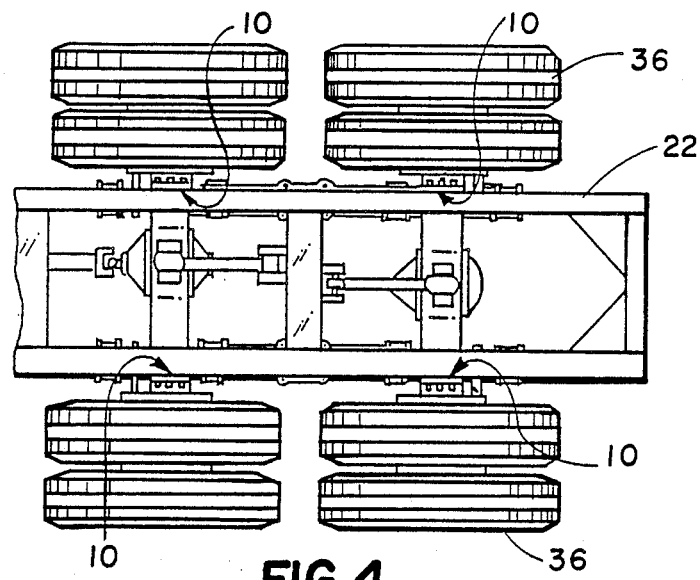
FIG. 4 is a section view taken along the line 4—4 of FIG. 3.

In FIG. 4, four brackets 10 of the invention are installed in the dump truck 21. Also, as shown in enlarged FIGS. 5 and 6, the brackets 10 are attached to the frame 22 of the vehicle by bolts 24. Alternatively, the bracket 10 can be welded to the frame, or other suitable attaching means may be employed. The frame rest portion 14 of the bracket 10 is located directly under the frame 22. The vertical stop portion 16 is located directly over the axle housing 26. Arrows 28 show the direction of vehicle movement, which is forward movement, and forward translation prevention portion 18 of the bracket 10 is located at the rear side of the axle housing 26. The rearward translation prevention portion 20 is located at the front side of axle housing 26.

Figure 7:
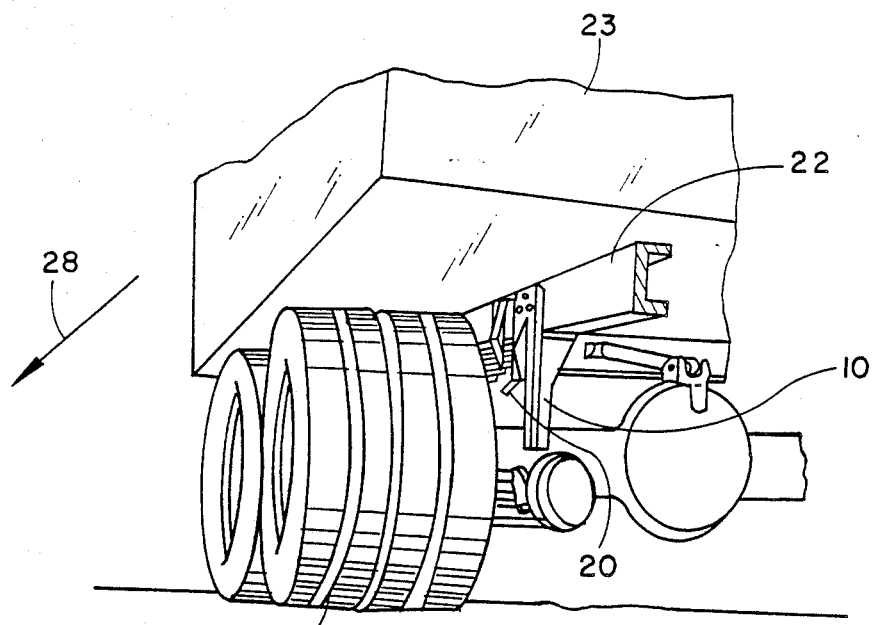
FIG. 7 is a schematic view of the vehicle viewed from the rear prior to a suspension failure.

In FIG. 7, the bracket 10 of the invention is installed on the frame 22, and the vehicle is undergoing normal operation.

Figure 8:
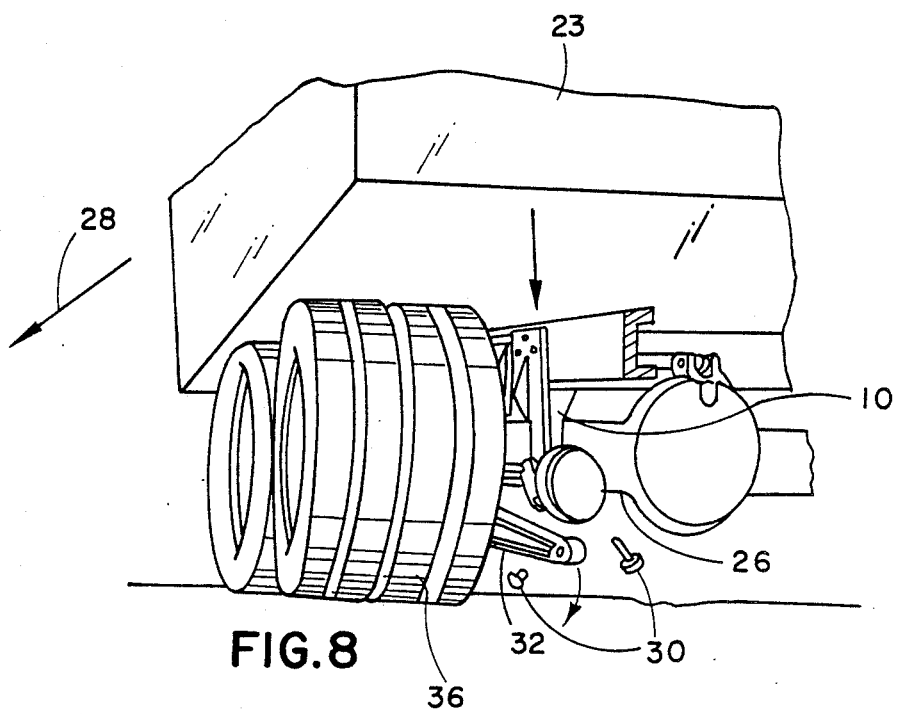
FIG. 8 is a sequence view after FIG. 7 after a suspension failure has occurred.

In FIG. 8, the suspension has failed and the bracket 10 of the invention is in position adjacent axle housing 26 to prevent the vehicle body and frame from translating with respect to the axle housing 26. More particularly, a bolt 30 which connects walking beam 32 to the lower side of the axle housing 26 has broken. A number of significant benefits are derived for using the invention. First, the amount of vehicle leaning is relatively small (e.g. 8 inches or less) as opposed to a prior art leaning which is relatively large (e.g. 14 inches). Second, the invention prevents the back of the vehicle from skewing and from exerting unwanted steering forces. Third, the tires are prevented from blowing out thereby preventing an even greater leaning such as 10-12 additional inches. Fourth, the invention prevents the walking beam from contacting the road surface.

Figure 9C:
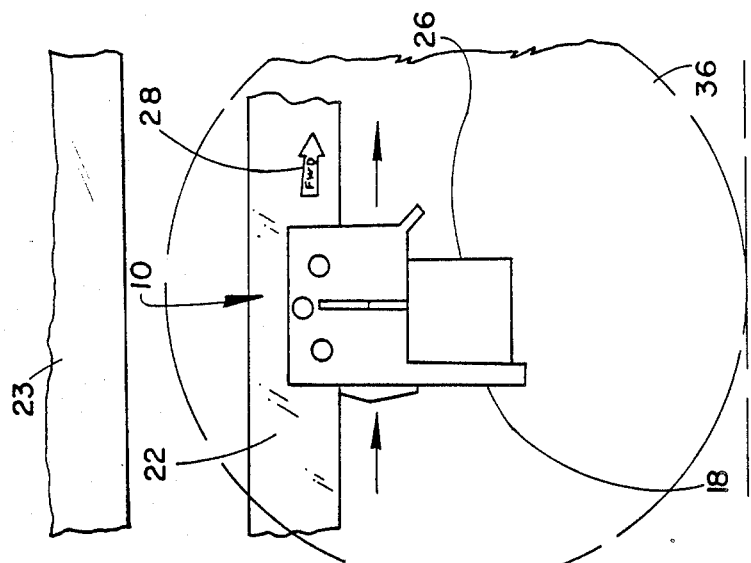
FIGS. 9A–9C are sequence views of the operation of the bracket of the invention prior to, during, and subsequent to a suspension failure.
Figure 9B:
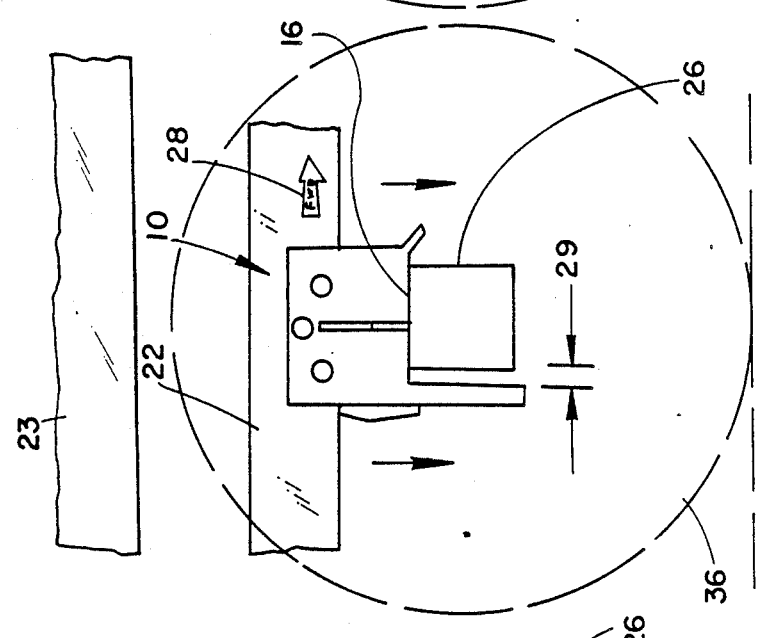
Figure 9A:
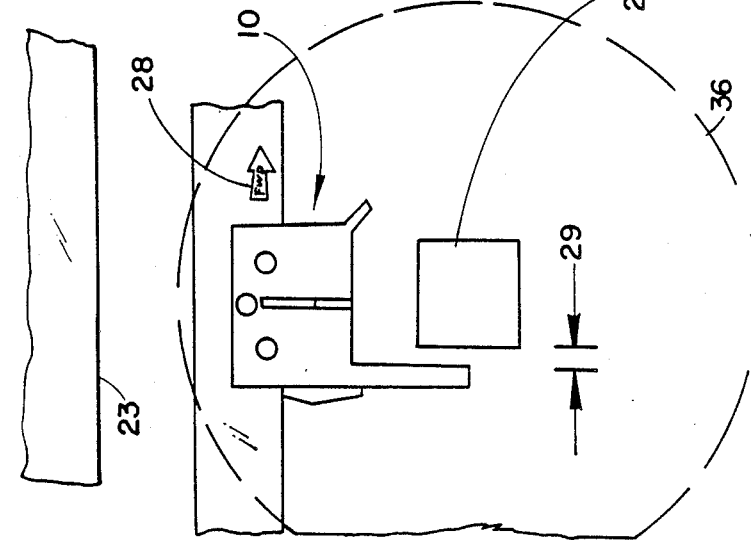
Figure 10:
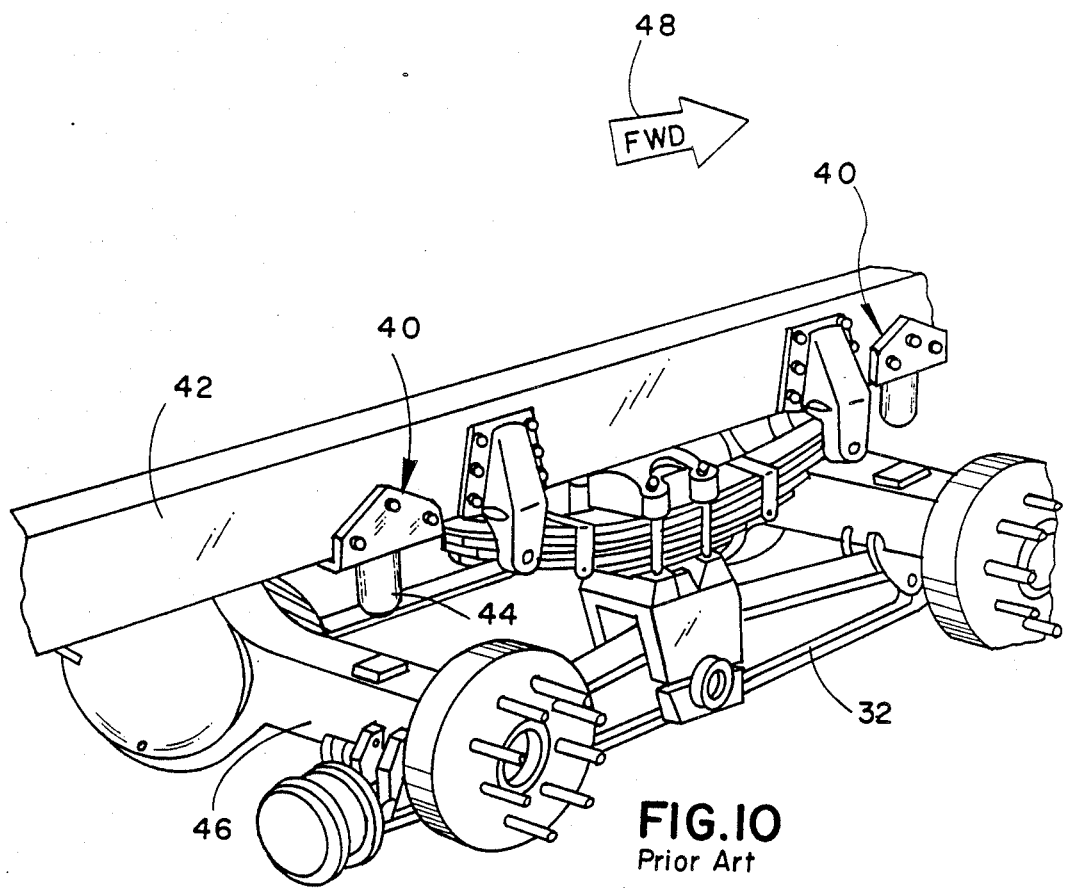
FIG. 10 is a view of a prior art vertical stop in use.

For a greater appreciation of the operation of the bracket 10 of the invention, FIGS. 9A-9C show in sequence the events that occur before, during, and after the suspension failure shown in FIG. 8. More particularly, in FIG. 9A, the vehicle is proceeding normally in the forward direction shown by arrow 28. The bracket 10 is located above axle housing 26.

In FIG. 9B, the failure of the suspension has just occurred, and the frame 22 of the vehicle has just fallen onto the axle housing 26. More specifically, the vertical stop portion 16 of the bracket 10 rests upon the upper surface of the axle housing 26 and the body 23 is not in contact with the tires 36. In FIG. 9B, translation of the frame 22 with respect to the axle housing 26 has not yet occurred.

However, in FIG. 9C, the frame 22 has slightly translated in the direction of arrow 28 with respect to the axle housing 26. In this view, the forward translation prevention portion 18 of the bracket 10 has moved a short distance 29 into position against the rear side of the axle housing 26. The forward translation prevention portion 18 prevents the axle housing 26 from skewing or sliding and translating behind the bracket 10 subsequent to the suspension failure. In all of FIGS. 9A, 9B and 9C, the body 23 remains above the level of the tires 36.

Figure 10A:
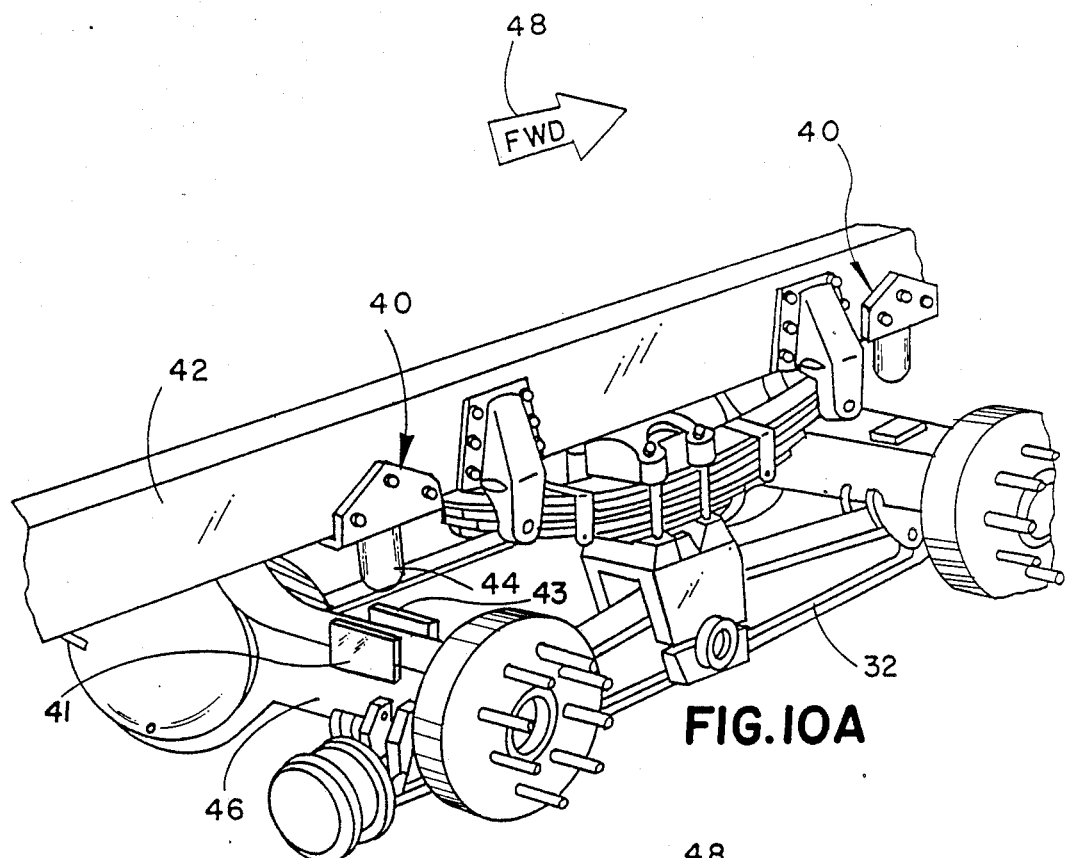
FIG. 10A is a view of another embodiment of the invention wherein means for preventing the frame from translating away from the axles is attached to axle housings.

In FIG. 10A another embodiment of the invention is shown. Using a conventional prior art vertical stop 40, plates 41 and 43 are attached (e.g. welded) to the axle housing 46. Plate 41 prevents forward translation of frame 42, and plate 43 prevents rearward translation of frame 42 in the event of a suspension failure. More particular, the stop 40 is trapped between plates 41 and 43 when a suspension failure occurs, and translation of the frame 42 is thereby prevented.

Figure 10B:
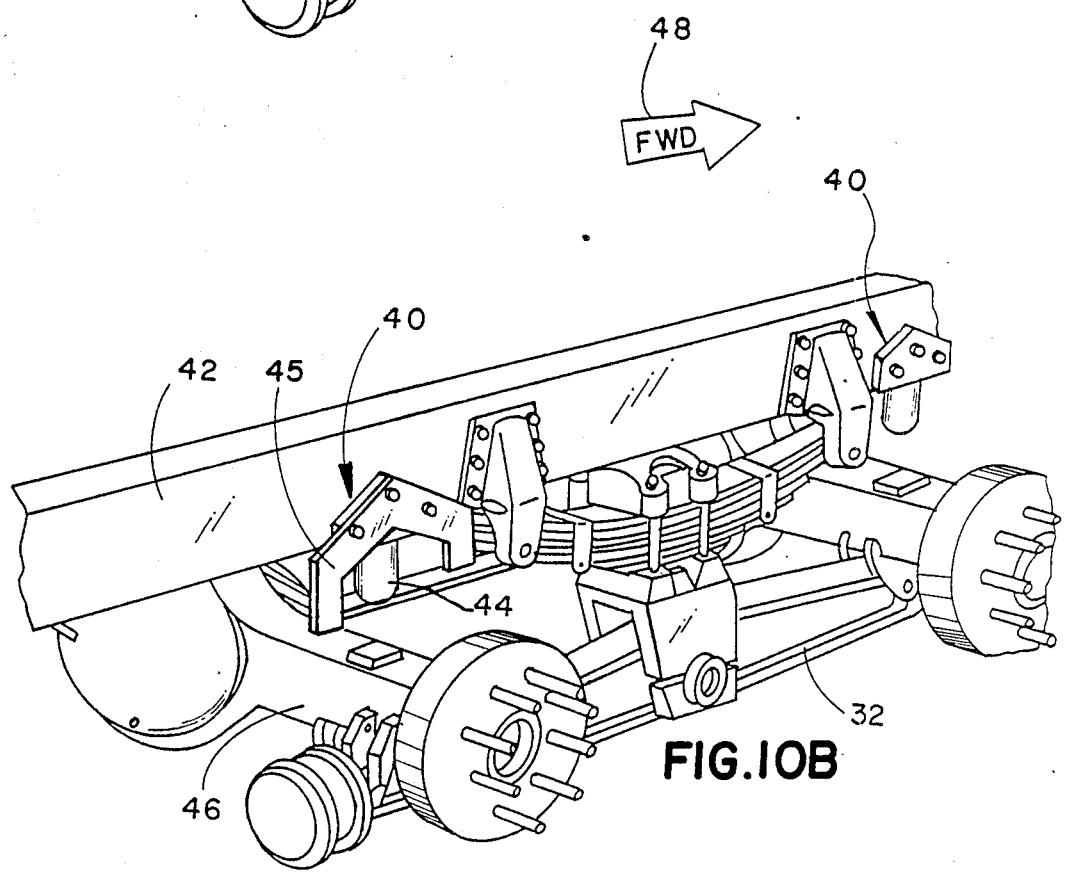
FIG. 10B is a view of another embodiment of the invention wherein means for preventing the frame from translating with respect to the axles is attached to a conventional metal stop.

In FIG. 10B, another embodiment of the invention is shown. Using a conventional prior art vertical stop 40, J or U-shaped plate 45 is attached (e.g. by welding or bolting) to the frame 42 and encompasses the stop 40. Plate 45 prevents forward or rearward translation of frame 42, in the event of a suspension failure, and the stop 40 prevents excessive lean.

The beneficial features of the invention as just described are in sharp contrast with the vertical stop in the prior art that is depicted in FIGS. 4A, 10 and 11 through 14C. More specifically with respect to the prior art shown in FIG. 10, the prior art vertical stop 40 is attached to a frame 42 and has a cylindrical stop portion 44 located over an axle housing 46.

Figure 4A:
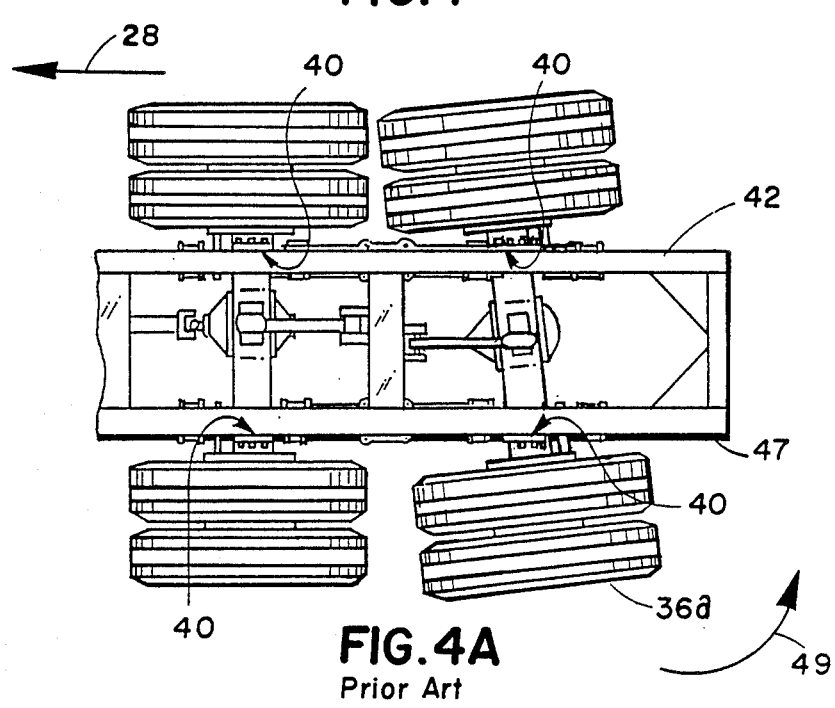
FIG. 4A is a top view of the prior art embodiment shown in FIG. 10.

As shown in FIG. 4A, with the prior art, when a suspension fails at the left rear side 47, and the brakes are applied or an uneven road surface is encountered, the left rear wheels 36a skew counterclockwise as shown by the direction of arrow 49. This is a dangerous condition which leads to severe loss of control.

Figure 11:
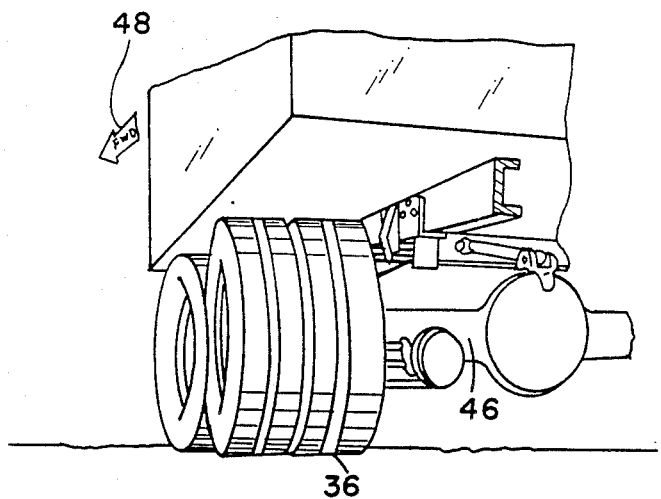
FIG. 11 is a view of the prior art vertical stop in position before a suspension failure.
Figure 12:
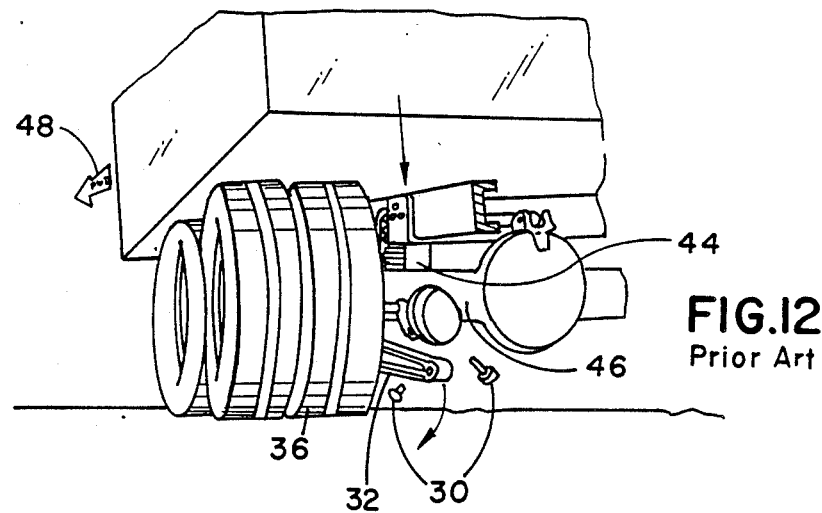
FIG. 12 is a view of the prior art vertical stop resting upon the axle housing just after a suspension failure.

FIG. 11 shows the prior art vertical stop 40 in normal operation with the vehicle moving forward in the direction of the arrow 48. In FIG. 12, the suspension undergoes a failure in which bolt 30 breaks, and walking beam 32 of the suspension is no longer supported by the bolt 30. At this point in time, the vertical stop portion 44 of the prior art device rests upon the top surface of the axle housing 46.

In such a case with a typical load-bearing truck such as a dump truck, garbage truck, etc. the frame and body will drop approximately 8 inches on the side that the break occurs, and the overall aspect of the truck will be leaning toward the side of the break in the suspension.

It is understood that a break in the suspension can occur at a number of locations in the suspension, for example, the walking beam itself, walking beam end bolts, and differential housing mounting brackets for the walking beam.

Figure 13:
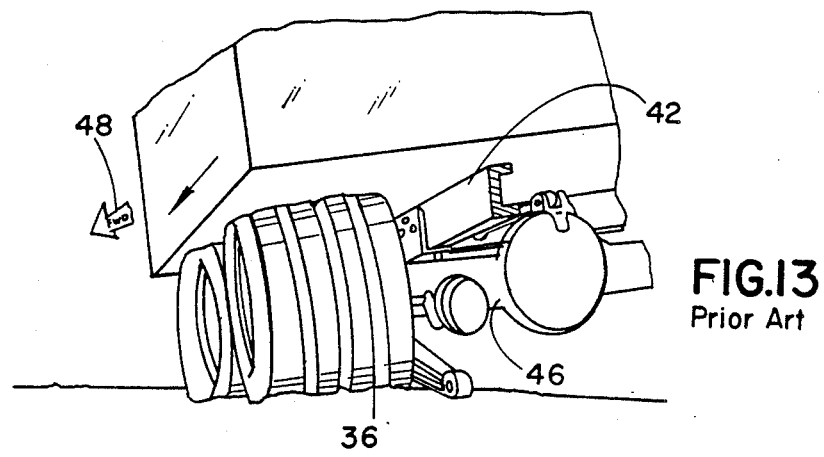
FIG. 13 is a view of the prior art vertical stop that has been translated away from the axle housing subsequent to a suspension failure.

Now in FIG. 13 the disastrous situation avoided by the bracket of the invention is occurring. That is, the frame 42 of the vehicle is continuing to move forward and skews and translates with respect to the axle housing 46 which is no longer properly supported by the suspension. As a result, when this translation occurs the vehicle would be highly susceptible to rolling over or to other loss of control. Also, the body 23 has fallen onto the tires which are flattened thereby.

The undesirable results of the prior art vertical stop 40 are illustrated in the schematic sequence shown in FIGS. 14A-14C. In FIG. 14A, the prior art cylindrical stop portion 44 is oriented above the axle housing 46 during normal operation of the vehicle. However, once the suspension failure has occurred, the frame 42 falls toward the axle housing 46, as shown in FIG. 14B, and the prior art cylindrical portion 44 rests upon the top surface of axle housing 46. However, as shown in FIG. 14C, as the vehicle frame 42 continues to move forward and the axle housing is skewed, the cylindrical portion 44 of the prior art is not prevented from sliding off of the axle housing 46; and nothing prevents the vehicle from rolling over once the axle housing 46, axles, and associated wheels and tires are skewed under the vehicle body and frame. Also, once the cylindrical portion 44 slides off of the axle housing 46, the body 23 falls upon the tires 36 which can rupture.

Although it is contemplated that the principles of the invention can be applied with a wide variety of vehicle suspension systems, the suspension system that has been shown in the figures herein is that known commonly as a walking beam tandem truck suspension system. More specifically, as best shown with respect to FIG. 5, the walking beam suspension system includes leaf springs 23 connected to the vehicle frame 22 by end brackets 25. Beneath the leaf springs 23 is placed a support 27 for the walking beam 32. An upper plate 33 is located above the leaves 23, and bolts 39 are used to sandwich the leaves 23 between the upper plate 33 and the support walking beam support 27. The walking beam 32 is pivoted by trunnion bar 35 onto the support 27. Each end of the walking beam 32 is pivotably connected by a bolt 30 and associated bushings to the under surface side of a respective axle housing 26.

When a vehicle is equipped with the bracket 10 of the invention, it is preferred that the bracket 10 is installed at the vicinity of each end of each axle housing that is located below the load bearing portion of the vehicle. More specifically, in the dump truck 21 shown in FIGS. 3 and 4, there are two load bearing axle housings in the dump truck 21. Consequently, it is contemplated that four brackets 10 of the invention are used, and four brackets 10 are shown in FIG. 4.

Figure 5:
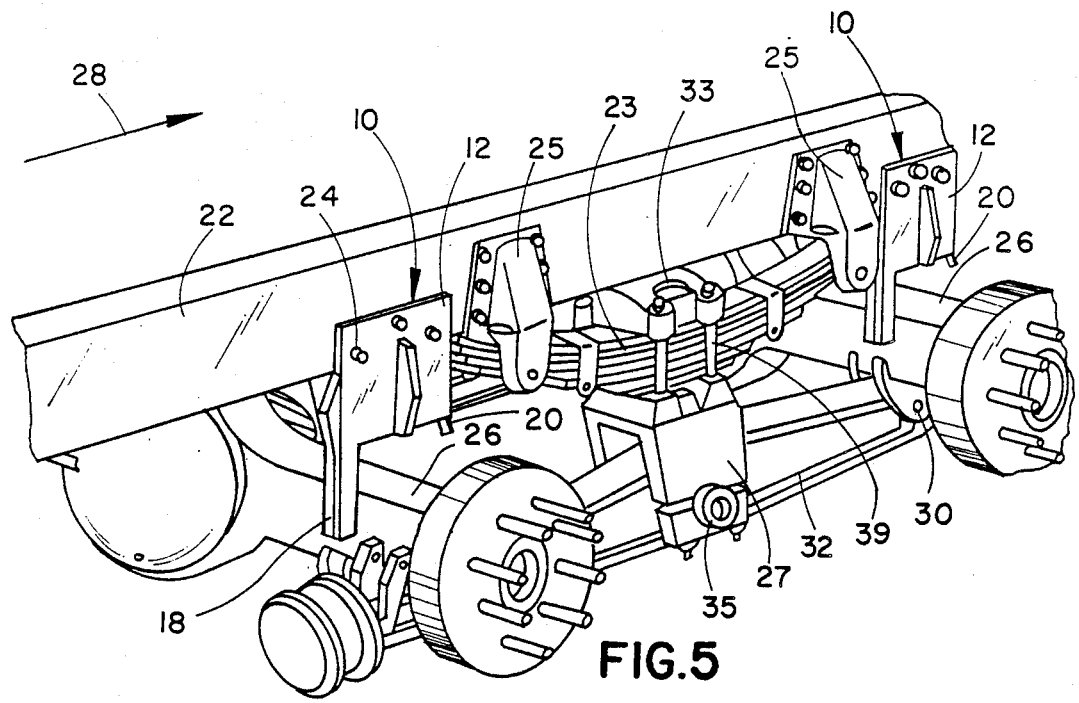
FIG. 5 is a perspective view taken from a location away from the vehicle looking toward the vehicle showing a set of brackets of the invention installed.
Figure 6:
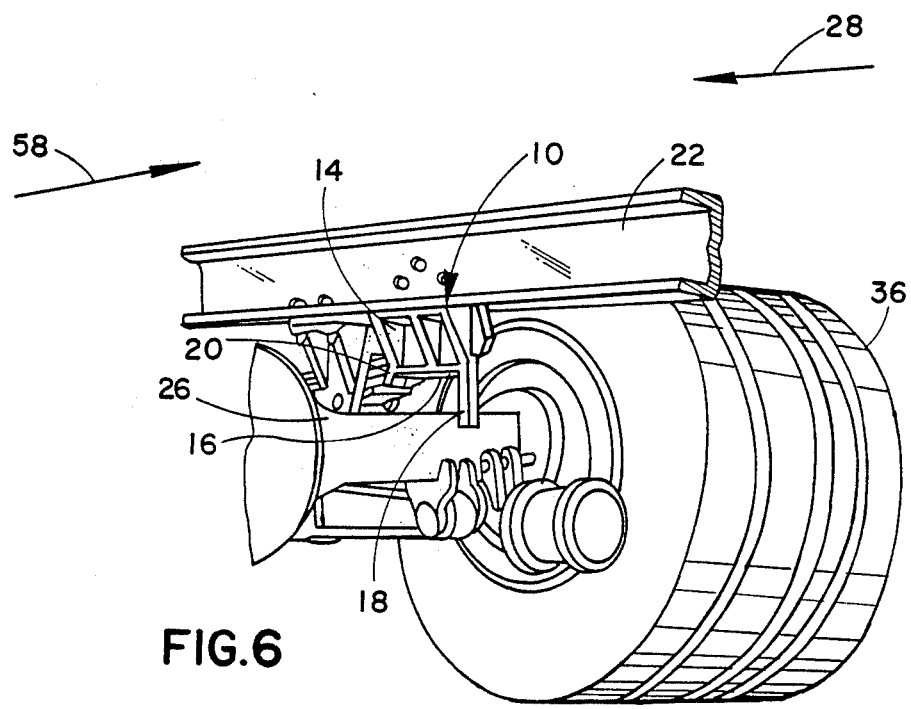
FIG. 6 is a view from underneath the vehicle looking toward the frame of the vehicle showing a bracket of the invention installed.

Referring to FIGS. 5 and 6, although the primary danger of the skewing of the axle housing 26 with respect to the frame 22 would result when the vehicle is proceeding in the forward direction as shown by arrows 28, it is also possible that a suspension failure can occur while the vehicle is proceeding in a backward or reverse direction as shown by arrow 58 in FIG. 6. If a suspension failure occurred during backward motion of the vehicle 21, then the rearward translation prevention portion 20 of the bracket 10 of the invention would be utilized. It is noted that the size of the rearward translation prevention portion 20 of the bracket 10 is shorter in length than the forward translation prevention portion 18 of the bracket 10. This is so because under normal circumstances the speed of a vehicle 21 in the rearward direction is relatively low when compared to the speed of the vehicle in the forward direction. Therefore, a shorter translation prevention portion is required to prevent rearward momentum from translating the frame with respect to the axle housing than would be required to prevent forward translation of the frame with respect to the axle housing.

The rearward translation prevention portion 20 also prevents forward translation of the axle housing 26 with respect to the frame 22 if the throttle were applied during a suspension failure.

Although a variety of methods and materials may be contemplated for fabricating the bracket of the invention, it is preferred that a high quality steel be used.

Although a wide variety of structural configurations of the bracket 10 of the invention can be employed, in the preferred embodiment shown in FIGS. 1 and 2, the vertical stop portion 16 is comprised of an assembly that includes a bottom plate 31 and ribs 33 which extend between the bottom plate 31 and the frame supporting portion 14. As further shown in FIGS. 1 and 2, the rearward translation prevention portion 20 and the bottom plate 31 are formed from a single piece of metal. In addition, one of the ribs 33 and the forward translation prevention portion 18 of the bracket 10 are formed from a single piece of metal. The frame attachment portion 12 also includes a wall portion 35 that extends to the bottom plate 31. The bracket 10 of the invention can readily be formed by welding the various component parts together to form a strong, rigid bracket or can be cast as a single unified structure. The frame attachment portion 12 includes holes 37 through which bolts can be threaded into complementary holes in the frame 22 of the vehicle. Thereby the bracket 10 of the invention can be attached to the frame 22 of the vehicle.

Figure 15:
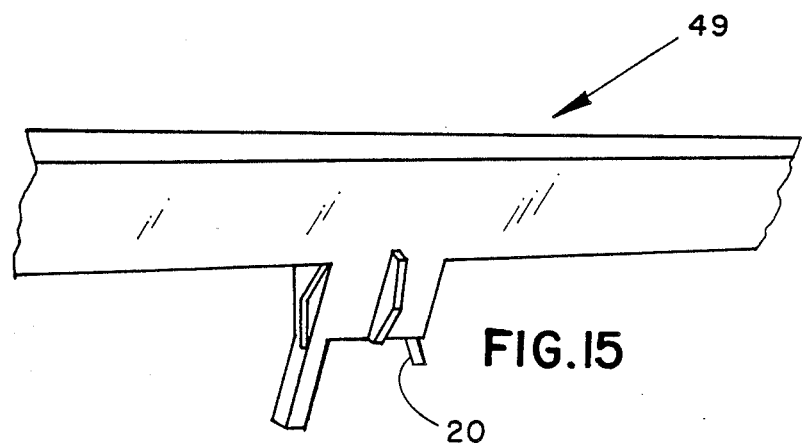
FIG. 15 illustrates a unified frame and translation prevention means.

Obviously, many modifications may be made without departing from the basic spirit of the present invention. For example, the bracket 10 of the invention can be formed integrally with the frame 22 to form a unified frame/translation-preventing-bracket structure 49 as shown in FIG. 15. Another modification that could be employed is to use chains, cables, or rods for connecting the frame to the axle housing to prevent the axle housing from translating with respect to the frame. Accordingly, it will be appreciated by those skilled in the art that within the scope of the appended claims, the invention may be practiced other than has been specifically described herein.

What is claimed is:

1. In a motor vehicle having a frame, a suspension supporting the frame, and tires, wheels, and axles within housings spaced from the frame by the suspension, apparatus comprising:
   rigid means extending forward from the frame, rigidly connected with said frame and having a lower free terminal end, for engaging at least one vertical side of an axle housing for preventing the frame from translating away from the axles when the suspension fails during movement of the vehicle and when said vertical side of the axle housing contacts said downwardly extending rigid means.

2. The apparatus described in claim 1, wherein said frame translation prevention means is formed integrally with said frame.

3. The apparatus described in claim 1, wherein said frame translation prevention means are comprised of an attaching portion attached to the frame and a translation prevention portion extending downward from said frame attachment portion.

4. The apparatus described in claim 3, wherein said frame translation prevention means further includes a vertical stop portion extending downward from said frame attachment portion.

5. The apparatus described in claim 4, wherein said frame translation prevention means includes a forward translation prevention portion extending downward from said vertical stop portion.

6. The apparatus described in claim 4, wherein said frame translation prevention means includes a rearward translation prevention portion extending downward from said vertical stop portion.

7. The apparatus described in claim 3, wherein said frame translation prevention means further includes a frame rest portion extending under the frame from said frame attachment portion.

8. The apparatus described in claim 1 wherein said downward extending rigid means is one of J-shaped and U-shaped and is positioned encompassing a vertical stop member attached to the frame.

9. In a motor vehicle having a frame, a suspension supporting the frame, and tires, wheels, and axles in a housing spaced from the frame by the suspension, apparatus comprising:
   rigid means for contacting at least one vertical side of the axle housing for preventing the frame from translating away from the axles when the suspension fails during movement of the vehicle, said translation prevention means attached to the frame, said translation prevention means comprises of:
   a portion attached to the frame,
   a vertical stop portion extending downward from said portion attached to the frame,
   a rigid forward translation prevention portion extending downward from said vertical stop portion at the rear end thereof, a rigid rearward translation prevention portion extending downward from said vertical stop portion at the front end thereof, and a frame rest portion extending under the frame from said vertical stop portion.

10. A rigid bracket for attachment to a vehicle frame above an axle housing and capable of contacting at least one vertical side of the axle housing, said bracket comprising:

a frame attachment portion, a vertical stop portion extending vertically downward from said attachment portion toward the axle housing said vertical stop portion having a rear end and a front end, and a forward translation prevention portion extending vertically downward from said vertical stop portion at the rear end thereof and behind the axle housing and capable of contacting at least one vertical side of the axle housing to prevent the vehicle frame from translating forward with respect to the axle housing.

11. The bracket described in claim 10, further including a frame supporting portion extending under the frame beneath said frame attachment portion and above said vertical stop portion.

12. The bracket described in claim 10, further including a rearward translation prevention portion extending substantially vertically downward from said vertical stop portion at the front end thereof and in front of the axle housing.

13. A rigid bracket for attachment to a vehicle frame above an axle housing and capable of contacting at least one vertical side of the axle housing, said bracket comprising:

a frame attachment portion, a vertical stop portion descending vertically downward from said attachment portion toward the axle housing, said vertical stop portion having a rear end and a front end, and a forward translation prevention portion extending vertically downward from said vertical stop portion at the rear end thereof and behind the axle housing, a frame supporting portion extending under the frame beneath said frame attachment portion and above said vertical stop portion, and a rearward translation prevention portion extending substantially vertically downward from said vertical stop portion at the front end thereof and in front of the axle housing and capable of contacting at least one vertical side of the axle housing to prevent the vehicle frame from translating with respect to the axle housing.

14. The bracket described in claim 13, wherein said vertical stop portion is comprised of an assembly including a bottom place and ribs extending from said bottom plate to said frame supporting portion.

15. The bracket described in claim 14 wherein said frame attachment portion includes a wall portion that extends to said bottom plate.

16. A bracket for attachment to a vehicle frame above an axle housing, said bracket comprising:

a frame attachment portion, a vertical stop portion descending vertically from said attachment portion toward the axle housing, said vertical stop portion having a rear end and a front end, a forward translation prevention portion extending vertically downwardly from said vertical stop portion at the rear end thereof and behind the axle housing, a frame supporting portion extending under the frame beneath said frame attachment portion and above said vertical stop portion, and a rearward translation prevention portion extending substantially vertically downward from said vertical stop portion at the front end thereof and in front of the axle housing, wherein said vertical stop portion is comprised of an assembly including a bottom plate and ribs extending from said bottom plate to said frame supporting portion, and wherein said rearward translation prevention portion and said bottom plate are formed from a single piece of metal.

17. A bracket for attachment of a vehicle frame above an axle housing, said bracket comprising:

a frame attachment portion, a vertical stop portion descending vertically from said attachment portion toward the axle housing, said vertical stop portion having a rear end and a front end, a forward translation prevention portion extending vertically downward from said vertical stop portion at the rear end thereof and behind the axle housing, a frame supporting portion extending under the frame beneath said frame attachment portion and above said vertical stop portion, and a rearward translation prevention portion extending substantially vertically downward from said vertical stop portion at the front end thereof and in front of the axle housing, wherein said vertical stop portion is comprised of an assembly including a bottom plate and ribs extending from said bottom plate to said frame supporting portion, and wherein one of said ribs and said forward translation prevention portion are formed from a single piece of metal.

18. A bracket for attachment to a vehicle frame above an axle housing, said bracket comprising:

a frame attachment portion, a vertical stop portion descending vertically from said attachment portion toward the axle housing, said vertical stop portion having a rear end and a front end, a forward translation prevention portion extending vertically downward from said vertical stop portion at the rear end thereof and behind the axle housing, a frame supporting portion extending under the frame beneath said frame attachment portion and above said vertical stop portion, and a rearward translation prevention portion extending substantially vertically downward from said vertical stop portion at the front end thereof and in front of the axle housing, wherein:

said vertical stop portion is comprised of an assembly including a bottom plate and ribs extending from said bottom plate to said frame supporting portion, said rearward translation prevention portion and said bottom plate are formed from a single piece of metal, one of said ribs and said forward translation prevention portion are formed from a single piece of metal, and said frame attachment portion includes a wall portion that extends to said vertical stop portion.

19. A rigid bracket for attachment to a vehicle frame above an axle housing and capable of contacting two vertical side of the axle housing, said bracket comprising:
- a frame attachment portion,
- a vertical stop portion descending vertically from said attachment portion toward the axle housing, said vertical stop portion having a rear end and a front end,
- a forward translation prevention portion extending vertically downward from said vertical stop portion at the rear end thereof and behind the axle housing and capable of contacting one vertical side of the axle housing to prevent the vehicle frame from translating with respect to the axle housing, and
- a rearward translation prevention portion extending substantially vertically downward from said vertical stop portion at the front end thereof and in front of the axle housing, and capable of contacting the other vertical side of the axle housing to prevent the vehicle frame from translating with respect to the axle housing.

20. In combination with a heavy-duty truck having a frame and further having at least one axle suspended on the frame by a suspension means, the axle being housed in an axle housing having at least a top portion and a rearward portion, a means for preventing a truck roll over or other hazardous driving condition from developing in the event of a failure of the suspension means, comprising first stop means rigidly secured to the frame and adapted to engage the top portion of the axle housing to limit the downward bottoming of the frame relative to the axle upon failure of the suspension means, and a second stop means connected with and extending downward from said first stop means and adapted to engage the rearward portion of the axle housing to limit the forward translational movement of the frame relative to the axle, as the truck continues to move forwardly during the failure of the suspension means.

21. In a motor vehicle having a frame, a suspension supporting the frame, and tires, wheels, and axles within housings space from the frame by the suspension, apparatus comprising:
- rigid means having a lower free terminal end extending downward from the frame a sufficient distance to extend beyond an upper surface of an axle housing for overlapping without contacting the axle housing prior to a suspension failure and for engaging at least one vertical side of an axle housing for preventing the frame from translating away from the axles when the suspension fails during movement of the vehicle and when said vertical side of the axle housing contacts said downwardly extending rigid means.

* * * * *